(12) United States Patent
Chen

(10) Patent No.: US 8,051,337 B2
(45) Date of Patent: Nov. 1, 2011

(54) SYSTEM AND METHOD FOR FAST CACHE-HIT DETECTION

(75) Inventor: Yi-Tzu Chen, Hsin-Chu (TW)

(73) Assignee: Taiwan Semiconductor Manufacturing Company, Ltd., Hsin-Chu (TW)

( * ) Notice: Subject to any disclaimer, the term of this patent is extended or adjusted under 35 U.S.C. 154(b) by 161 days.

(21) Appl. No.: 12/618,458

(22) Filed: Nov. 13, 2009

(65) Prior Publication Data

US 2010/0185904 A1 Jul. 22, 2010

Related U.S. Application Data

(60) Provisional application No. 61/146,574, filed on Jan. 22, 2009.

(51) Int. Cl.
*G06F 11/00* (2006.01)

(52) U.S. Cl. ......... 714/53; 714/6.1; 714/6.11; 714/6.13; 714/42; 714/54; 714/746; 714/768

(58) Field of Classification Search .................. 714/6.1, 714/6.11, 6.13, 42, 53, 54, 746, 768
See application file for complete search history.

(56) References Cited

U.S. PATENT DOCUMENTS

| | | | |
|---|---|---|---|
| 4,692,922 A * | 9/1987 | Kiriu et al. .................... 714/777 |
| 5,509,119 A | 4/1996 | La Fetra | |
| 5,598,422 A | 1/1997 | Longwell et al. | |
| 5,754,753 A * | 5/1998 | Smelser ....................... 714/6.13 |
| 5,917,838 A * | 6/1999 | Wardrop ....................... 714/767 |
| 6,038,693 A * | 3/2000 | Zhang ............................ 714/768 |
| 6,067,656 A * | 5/2000 | Rusu et al. .................... 714/768 |
| 6,772,383 B1 | 8/2004 | Quach et al. | |
| 6,813,626 B1 * | 11/2004 | Chng et al. .................... 708/501 |
| 6,898,738 B2 * | 5/2005 | Ryan et al. ....................... 714/42 |
| 6,968,427 B1 * | 11/2005 | Yee ................................ 711/118 |
| 7,376,877 B2 * | 5/2008 | Quach et al. ................... 714/746 |
| 7,437,597 B1 * | 10/2008 | Kruckemyer et al. ........ 714/6.11 |
| 7,949,931 B2 * | 5/2011 | Lastras-Montano .......... 714/785 |
| 2009/0006899 A1 * | 1/2009 | Gara et al. ....................... 714/42 |
| 2009/0077425 A1 * | 3/2009 | Gschwind et al. .............. 714/42 |
| 2010/0064205 A1 * | 3/2010 | Moyer ........................... 714/800 |

* cited by examiner

*Primary Examiner* — Robert Beausoliel, Jr.
*Assistant Examiner* — Joshua P Lottich
(74) *Attorney, Agent, or Firm* — Slater & Matsil, L.L.P.

(57) ABSTRACT

A system and method for fast detection of cache memory hits in memory systems with error correction/detection capability is provided. A circuit for determining an in-cache status of a memory address comprises an error detect unit coupled to a cache memory, a comparison unit coupled to the cache memory, a results unit coupled to the comparison unit, and a selection unit coupled to the results unit and to the error detect unit. The error detect unit computes an indicator of errors present in data stored in the cache memory, wherein the data is related to the memory address. The comparison unit compares the data with a portion of the memory address, the results unit computes a set of possible in-cache statuses based on the comparison, and the selection unit selects the in-cache status from the set of possible in-cache statuses based on the indicator.

20 Claims, 6 Drawing Sheets

SYSTEM AND METHOD FOR FAST CACHE-HIT DETECTION

This application claims the benefit of U.S. Provisional Application No. 61/146,574, filed on Jan. 22, 2009, entitled "System and Method for Fast Cache-Hit Detection," which application is hereby incorporated herein by reference.

TECHNICAL FIELD

The present invention relates generally to memory systems, and more particularly to a system and method for fast detection of cache memory hits in memory systems with error correction/detection capability.

BACKGROUND

In most modern computer systems, a memory system may have a significant impact on the performance of the computer system. A poorly designed memory system may cause a modern computer system with a state of the art processing unit to perform no better than an older computer system with an average processing unit. This may be due to slow access to programs, applications, data, and so forth, stored in the memory system. A poorly designed memory system may significantly delay access to memory and effectively negate performance advantages inherent in the state of the art processing unit. For example, the speed in which the processing unit may process instructions and data may be dependent on the ability of the memory system to provide the instructions and data to the processing unit. A slow memory system may make the processing unit wait unnecessarily.

FIG. 1 is a diagram illustrating a computer system 100. Computer system 100 includes a processing unit 105 and a memory system 110. Memory system 110 may be partitioned into multiple levels, with a first level of memory being registers 115 located in a processing unit, a second level of memory being a cache memory 120, a third level of memory being main memory 125, and a fourth level of memory being mass storage devices 130. In general, the amount of the memory available at each level will increase with level, while the speed will decrease. Generally, the speed of memory at a given level may be an order of magnitude slower than memory at a level immediately higher than it. For example, registers 115 in the first level of memory may amount to only tens or hundreds of bytes, while a mass storage device 130 may be on the order of terabytes in size, but the speed of the registers 115 may be hundreds if not thousands of times faster than the mass storage device 130.

Cache memory 120 is a relatively small but fast memory that may be used to temporarily hold instructions and/or data. Since cache memory 120 is relatively small, it may be unlikely that an entirety of instructions and/or data can be stored in cache memory 120. Rather, the instructions and/or data stored in cache memory 120 may be instructions and/or data that are predicted to be instructions and/or data that will be used by processing unit 105 in a relatively short amount of time. If the instructions and/or data required by processing unit 105 are residing in cache memory 120, then the instructions and/or data may be retrieved from cache memory 120 with relatively small delay. However, if instructions and/or data required are not in cache memory 120, then the instructions and/or data will need to be retrieved from main memory 125 or mass storage device 130 with significant delay.

Cache memory 120 include a cache data memory 135 that may be used to store instructions and/or data, a cache tag memory 140 that may be used to store high order address bits of instructions and/or data stored in cache data memory 135, and a cache controller 145 that may be used to manage the reading and writing of instructions and/or data in cache memory 120, as well as predicting instructions and/or data that will be needed in the future and retrieving them from lower levels of memory.

When a memory address of an instruction or data is presented to cache memory 120, high order bits (the tag) of the memory address may be used to index into cache tag memory 140 to determine if the instruction or data is stored in cache data memory 135. If the tag indicates that the instruction or data is stored in cache data memory 135, then cache controller 145 may be used to retrieve the instruction or data from cache data memory 135. If the tag indicates that the instruction or data is not stored in cache data memory 135, then the instruction or data may be retrieved from main memory 125 or mass storage 130. As the instruction or data is retrieved from main memory 125 or mass storage 130, it may also be stored in cache data memory 135. Storing the instruction or data may force out instructions and/or data already stored in cache data memory 135. Additionally, cache tag memory 140 may also be updated to reflect the newly stored instruction and/or data.

Some computer systems also make use of error correcting codes (ECC) to protect the integrity of instructions and/or data stored in its memory system. The use of an ECC adds additional bits of information to each byte, word, and so on, in the memory system to detect (and in some cases, correct) errors in the instructions and/or data stored in the memory system. The addition of ECC may help to increase the complexity of determining cache memory hits (i.e., the requested instruction or data is stored in the cache memory) or cache memory misses (i.e., the requested instruction or data is not stored in the cache memory), since additional operations may need to be performed to verify that there is an ECC match in addition to memory address match. This may result in slowing down cache memory performance as well as increasing cache memory design complexity.

FIG. 2a is a diagram illustrating a portion of a cache memory 200 wherein cache memory 200 makes use of a prior art technique for determining cache memory hit or miss and wherein the memory system makes use of ECC. Cache memory 200 includes an ECC generator 205 that may be used to generate an ECC from an m bit input CPU-tag data input (i.e., high order bits of a memory address from the processing unit). The ECC, as generated by ECC generator 205, may be provided to cache tag memory 207 (which may be similar to cache tag memory 140, for example), where if the CPU-tag is in cache tag memory 207, the cache-tag associated with the CPU-tag may be retrieved.

The cache-tag and the ECC may then be provided to a single error correction-double error detection (SEC-DED) ECC unit 209 that may be used to correct the cache-tag using the ECC if necessary (and if possible). SEC-DED ECC unit 209 may produce a corrected cache-tag, which may then be compared with the CPU-tag in an equality comparator 211. If the corrected cache-tag and the CPU-tag are equal, then equality comparator 211 may assert that a cache memory hit has occurred. If the corrected cache-tag and the CPU-tag are not equal, then equality comparator 211 may assert that a cache memory miss has occurred.

FIG. 2b is a diagram illustrating a portion of a cache memory 250 wherein cache memory 250 makes use of a prior art technique for determining cache memory hit or miss and wherein the memory system makes use of ECC. Cache memory 250 attempts to shorten delays incurred by the addition of ECC by computing a fast hit value, which may or may not represent an actual cache memory hit. Cache memory 250 includes cache tag memory 207, SEC-DED ECC unit 209, and equality comparator 211 which serve substantially the same purpose in cache memory 250 as they do in cache memory 200, which is determining the occurrence of a cache memory hit or a cache memory miss. The result produced by these units is referred to as being a true hit.

However, to shorten delays due to the inclusion of the ECC, cache memory 250 also computes a fast hit. As discussed above, a fast hit may not accurately represent a cache memory hit. A memory address that results in a fast hit may actually end up being a cache memory miss, so a fast hit is not 100 percent fool proof. Cache memory 250 includes an ECC generator 255. Similar to ECC generator 205, ECC generator 255 generates an ECC from the CPU-tag from the memory address provided by the processing unit. ECC generator 255 outputs an ECC that may be compared with an ECC retrieved from cache tag memory 207. The comparison may be performed by an equality comparator 257. If the two ECCs are equal, then a fast hit is asserted. Since the delay through EEC generator 205 and equality comparator 257 is typically shorter than the delay through cache tag memory 207, SEC-DED ECC unit 209, and equality comparator 211, it will usually complete faster.

FIG. 2c is a diagram illustrating a detailed view of SEC-DED ECC unit 209. SEC-DED ECC unit 209 includes a SEC-DED syndrome unit 265 that may be used to compute an error syndrome from the cache-tag. The error syndrome may be a pattern that is representative of any errors present in the cache-tag. The error syndrome may be provided to an error bit decoder 267 that may be used to determine which bit (or bits) in the cache-tag contains an error. An error bit corrector 269 may then be used to correct the erroneous bit (bits) in the cache-tag.

The error syndrome from SEC-DED syndrome unit 265 may also be provided to a SED/DED decoder 271. SED/DED decoder 271 may determine from the error syndrome provided by SEC-DED syndrome unit 265 if a single error detection (SED) or a double error detection (DED) occurred. If a SED occurred, then error bit corrector 269 may be able to correct the error in the cache-tag. If a DED occurred, then error bit corrector 269 may not be able to correct the error in the cache-tag and a cache memory miss has occurred. The output of error bit corrector 269 may be compared with the CPU-tag in equality comparator 211 to determine if a cache memory hit or a cache memory miss occurred.

SUMMARY

These and other problems are generally solved or circumvented, and technical advantages are generally achieved, by embodiments of a system and a method for fast detection of cache memory hits in memory systems with error correction/detection capability.

In accordance with an embodiment, a circuit for determining an in-cache status of a memory address is provided. The circuit includes an error detect unit coupled to a cache memory, a comparison unit coupled to the cache memory, a results unit coupled to the comparison unit, and a selection unit coupled to the results unit and to the error detect unit. The error detect unit computes an indicator of errors present in data stored in the cache memory, wherein the data is related to the memory address. The comparison unit compares the data with a portion of the memory address, wherein the portion of the memory address is provided by a processing unit coupled to the circuit. The results unit computes a set of possible in-cache statuses based on the comparison of the data with the portion of the memory address, and the selection unit selects the in-cache status from the set of possible in-cache statuses based on the indicator.

In accordance with another embodiment, a computer system is provided. The computer system includes a processing unit that performs operations, and a memory system coupled to the processing unit. The memory system stores data and detects and corrects errors in data stored in the memory system. The memory system includes a cache memory coupled to the processing unit, a cache memory controller coupled to the cache memory, and a main memory coupled to the processing unit. The cache memory provides a first level of storage, and the main memory provides a second level of storage. The cache controller determines if a memory address provided by the processing unit resides in the cache memory. The cache memory controller computes an error indicator and a comparison of a portion of the memory address with data (related to the memory address) from the cache memory substantially concurrently to determine if the memory address resides in the cache memory.

In accordance with another embodiment, a method for determining if a memory address resides in a cache memory is provided. The method includes computing an indication of an error in data in the cache memory associated with the memory address, comparing the data with a portion of the memory address, and computing a set of possible permutations of the memory address residing in the cache memory based on results of the comparing and possible values of the indication. The method also includes selecting a permutation from the set of possible permutations using the indication. The computing an indication occurs substantially concurrently with the comparing and the computing a set of possible permutations.

An advantage of an embodiment is that a cache memory hit or cache memory hit may be determined in a timely manner compared to existing prior art techniques.

A further advantage of an embodiment is that if a cache memory hit is determined, then a cache memory hit has definitely occurred.

Yet another advantage of an embodiment is that integrated circuit real estate and power usage reductions are achievable due to a reduction in logic complexity.

The foregoing has outlined rather broadly the features and technical advantages of the present invention in order that the detailed description of the embodiments that follow may be better understood. Additional features and advantages of the embodiments will be described hereinafter which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the embodiments, and the advantages thereof, reference is now made to the following descriptions taken in conjunction with the accompanying drawings, in which.

DETAILED DESCRIPTION OF ILLUSTRATIVE EMBODIMENTS

The making and using of the embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The embodiments will be described in a specific context, namely a computer system with a memory system that makes use of ECC and cache memory to help improve memory system performance, with the ECC providing single bit error correction and double bit error detection. The invention may also be applied, however, to other computer systems with memory systems using ECC capable of correcting and detecting addition bit errors.

Figure 2A:
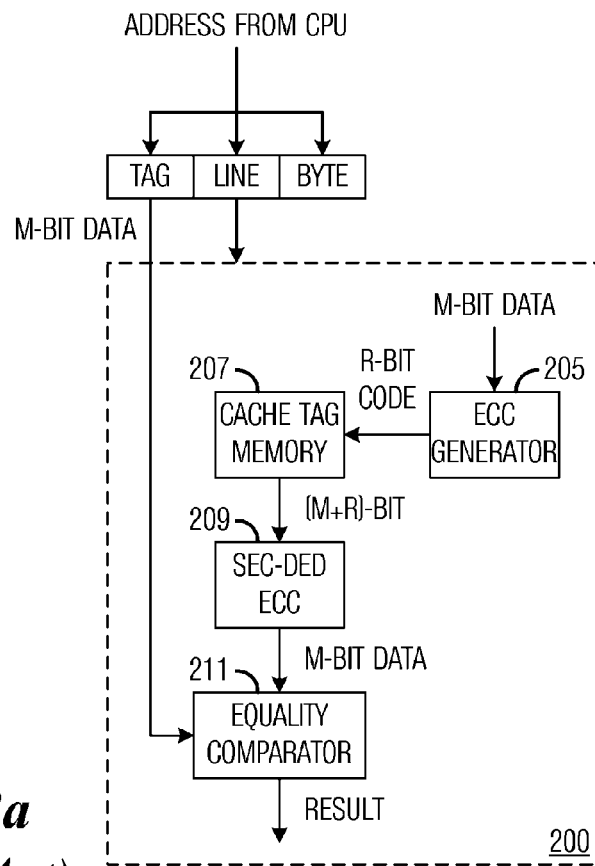
FIG. 2a is a diagram of a portion of a cache memory, wherein the cache memory makes use of a prior art technique for determining cache memory hit or miss.
Figure 2B:
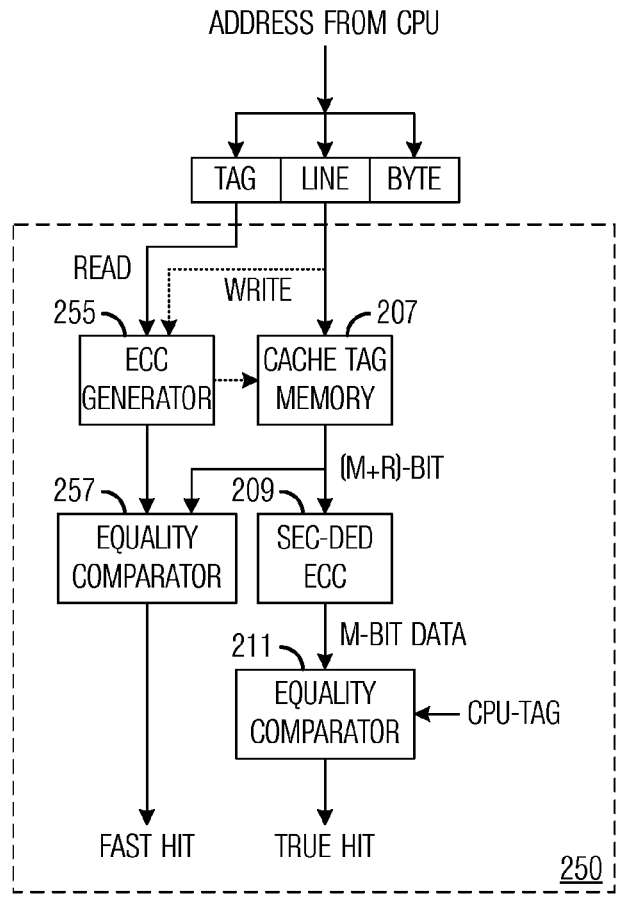
FIG. 2b a diagram of a portion of a cache memory, wherein the cache memory makes use of a prior art technique for determining cache memory hit or miss.
Figure 2C:
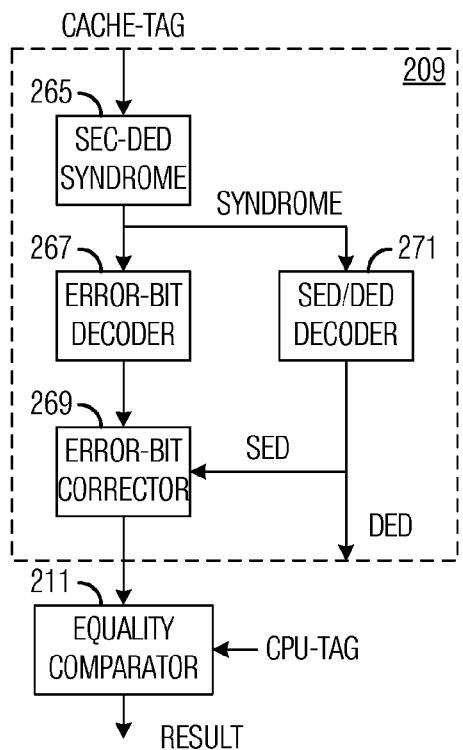
FIG. 2c is a diagram of a prior art single error correction/double error correction error correcting code (SEC-DED ECC) unit.
Figure 3A:
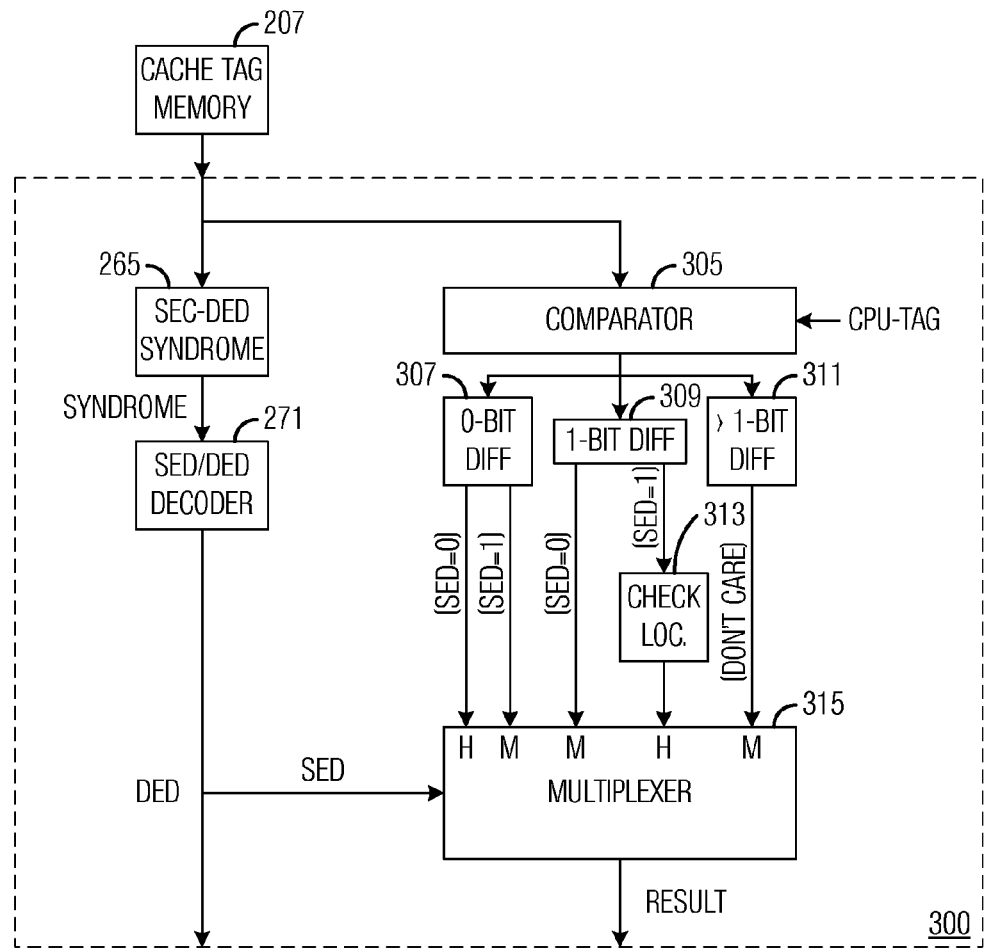
FIG. 3a is a diagram of a cache memory access unit.

FIG. 3a is a diagram illustrating a detailed view of a cache memory access unit 300. As shown in FIG. 3a, cache memory access unit 300 may determine if a memory address provided by a processing unit results in a cache memory hit or a cache memory miss. Cache memory access unit 300 may produce an output indicating a cache memory hit or a cache memory miss. For example, if the output of cache memory access unit 300 is true, then the memory address may have been a cache memory hit, while if the output is false, then the memory address may have been a cache memory miss. Cache memory access unit 300 may be an implementation or a replacement for a combination of SEC-DED ECC unit 209 and equality comparator 211 of FIGS. 2a and 2b.

Cache memory unit 300 may be coupled to cache tag memory 207 and may receive a cache-tag from cache tag memory 207, which may be based on the memory address provided by the processing unit. Cache memory access unit 300 includes SEC-DED syndrome unit 265 and SED/DED decoder 271. As used in cache memory access unit 300, SEC-DED syndrome unit 265 and SED/DED decoder 271 may be used to generate an error syndrome from a cache-tag provided at an input to cache memory access unit 300 and then determine from the error syndrome if the cache-tag contains an error. If the cache-tag contains an error, further determination may be performed to determine if the error in the cache-tag is a single bit error or a double bit error. According to an embodiment, if the cache-tag has an error of two bits or more, the error will be determined to be a double bit error. Alternatively, if an ECC with greater error detection and correction capability, instead of determining only single and double bit errors, SED/DED decoder 271 may be extended to determine an appropriate number of bit errors. For example, if an ECC capable of detecting up to four bit errors, SED/DED decoder 271 may be extended to determine single, double, triple, and quad bit errors.

Cache memory access unit 300 also includes a comparator 305 that may compare the cache-tag with a CPU-tag provided by processing unit. Comparator 305 compares the two tags and produces an output indicating a number of bits different between the cache-tag and the CPU-tag, such as a bit difference count. For example, if the cache-tag and the CPU-tag are identical, output of comparator 305 may indicate that there is a zero (0) bit difference between the cache-tag and the CPU-tag. The zero bit difference may be represented by asserting a true value (for instance, a high voltage value) in a zero bit difference unit 307. If there is a single bit difference between the cache-tag and the CPU-tag, then output of comparator 305 may indicate that there is a one (1) bit difference between the cache-tag and the CPU-tag (one bit difference unit 309). If there are two bits (or more) difference between the cache-tag and the CPU-tag, then output of the comparator 305 may indicate that there is more than one (1) bits difference between the cache-tag and the CPU-tag (greater than one bit difference unit 311). As discussed previously, if an ECC with greater error detection/correction capability was used, comparator 305 may be extended to produce more outputs corresponding to a wider range of bit differences between the cache-tag and the CPU-tag.

The bit difference (if any) between the cache-tag and the CPU-tag may then be used in conjunction with the output of SED/DED decoder 271 to determine a cache memory hit or a cache memory miss. For example, if there was zero bit difference or one bit difference between the cache-tag and the CPU-tag, then a cache memory hit or a cache memory miss may be dependent on the output of SED/DED decoder 271. However, if there was more than one bit difference between the cache-tag and the CPU-tag, then the determination of the result of the memory address may be independent of the output of SED/DED decoder 271.

For discussion purposes, let a comparison of the cache-tag and the CPU-tag made by comparator 305 determine that there is zero bit difference between the cache-tag and the CPU-tag, then if SED/DED decoder 271 determines that there was no bit errors in the cache-tag (SED=0, for example) then the memory address provided by the processing unit is in the cache memory (i.e., a cache memory hit has occurred). However, if there was a single bit error in the cache-tag (SED=1, for example) then the memory address provided by the processing unit is not in the cache memory (i.e., a cache memory miss has occurred).

For discussion purposes, let a comparison of the cache-tag and the CPU-tag made by comparator 305 determine that there is one bit difference between the cache-tag and the CPU-tag, then if SED/DED decoder 271 determines that there was no bit errors in the cache-tag (SED=0, for example) then the memory address provided by the processing unit is not in the cache memory (i.e., a cache memory miss has occurred). However, if there was a single bit error in the cache-tag (SED=1, for example) then the memory address provided by the processing unit is in the cache memory (i.e., a cache memory hit has occurred) if a location of the one bit difference is in the same location as specified by the error syndrome. A determination of whether the one bit difference is in the same location as specified by the error syndrome may be performed by a check location unit 313.

Figure 3B:
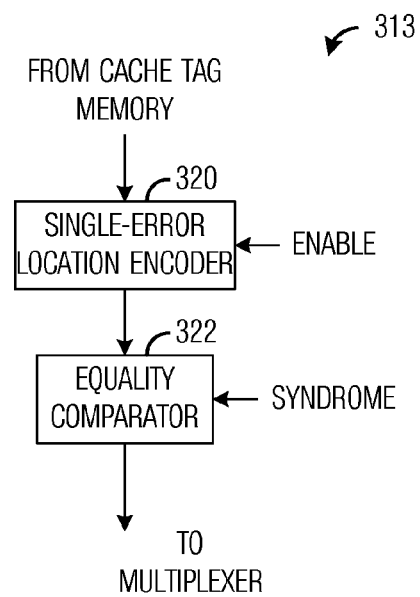
FIG. 3b is a diagram of a check location unit.

FIG. 3b is a diagram illustrating a detailed view of check location unit 313. Check location unit 313 includes a single-error location encoder 320 and an equality comparator 322. Single-error location encoder 320 may have as input an output from cache tag memory 207, which may provide information such as the cache-tag and so forth. An enable control signal from one bit difference unit 309 may be used to control the operation of single-error location encoder 320, which may compute a one bit error syndrome from the information provided by cache tag memory 207 when so enabled. Alternatively, single-error location encoder 320 may perform some other encoding on the information provided by one bit difference unit 309.

An output of single-error location encoder 320 (the one bit error syndrome) may be provided to equality comparator 322 that compares the one bit error syndrome with the error syndrome computed by SEC-DED syndrome unit 265. If the one bit error syndrome and the error syndrome are equal, then the location of the one bit difference as found by comparator 305 is the same as the location of the single bit error in the cache-tag. This means that the one bit difference may be correctable.

Now turning back to FIG. 3a, as discussed previously, if there are more than one bit differences (i.e., a two or greater bit difference), then there are too many bit differences (bit errors) and the ECC cannot correct the bit errors. Since there are too many bit errors, any information stored in the cache memory related to the memory address may be unreliable. Therefore, a good solution may be to retrieve information related to the memory address from other parts of the memory system, such as system memory or mass storage device. This may be achieved by determining that the memory address resulted in a cache memory miss.

In order to increase performance (e.g., reduce delay) rather than determining the result of the memory address (either a cache memory hit or a cache memory miss) directly from the output of comparator 305 and SED/DED decoder 271 when available, possible permutations of a difference unit associated with the bit difference count may be precomputed and then selected based on the actual output of SED/DED decoder 271. For example, if the bit difference count indicates that there was one bit difference in the comparison of the cache-tag and the CPU-tag, then two possible permutations may be computed using the output of the one bit difference unit 309. The two possible permutations may be computed using SED set to true and false, respectively.

Alternatively, all possible values (permutations) of the output of comparator 305 output may be precomputed then selected based on the actual output of SED/DED decoder 271. For example, outputs of zero bit difference unit 307, one bit difference unit 309, and greater than one bit difference unit 311 may used in computing permutations for each possible value of SED and DED before SED/DED decoder 271 actually determines SED or DED value.

Then, the multiple outputs of zero bit difference unit 307, one bit difference unit 309, and greater than one bit difference unit 311 may be provided to a multiplexer 315 that may have as a control input, an output of SED/DED decoder 271. The output of multiplexer 315 may then be dependent on the value of SED, for example. This may help to increase performance since the time required to determine either a cache memory hit or a cache memory miss may now be reduced to being about equal to a longer of the duration of the operation of SEC-DED syndrome unit 265 and SED/DED decoder 271 or comparator 305 and the computing of possible permutations of comparator 305 outputs plus a duration of multiplexer 315, rather than a sum of the duration of all of the above.

Figure 1:
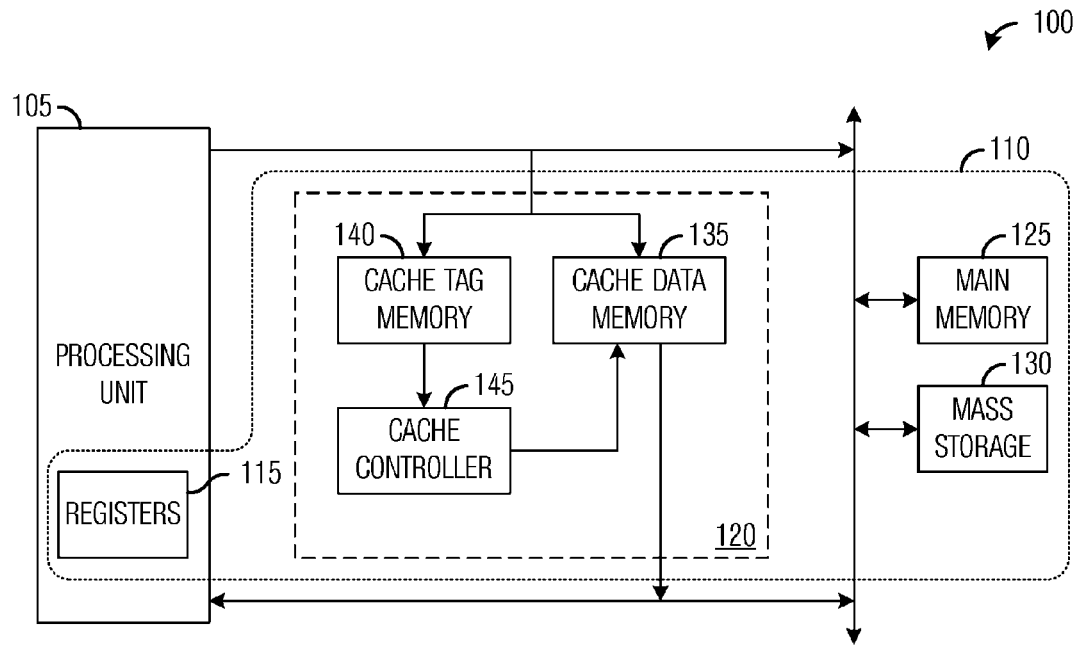
FIG. 1 is a diagram of a computer system.
Figure 4:
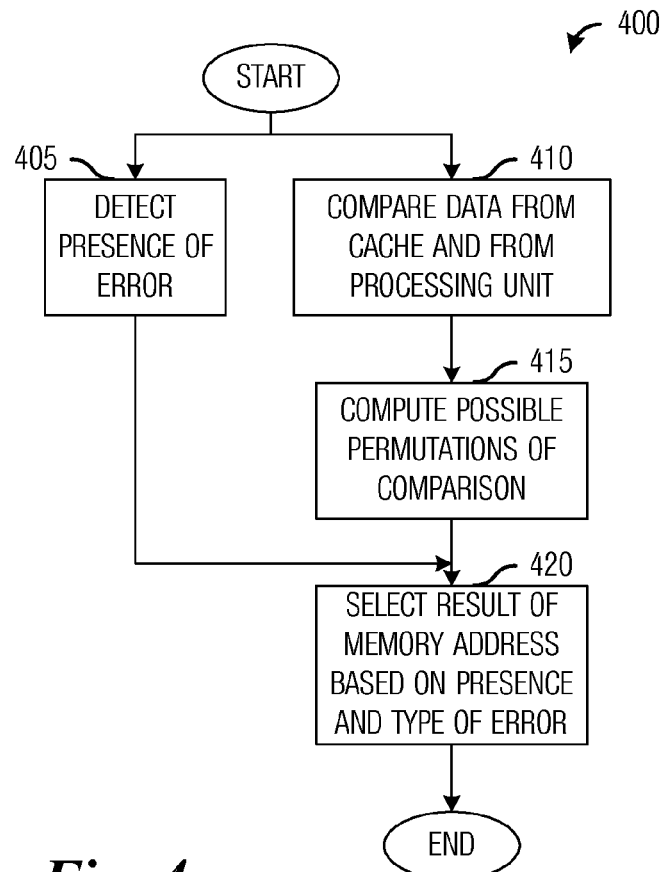
FIG. 4 is a flow diagram of an algorithm for determining if a memory address is in a cache memory.

FIG. 4 is a flow diagram of an algorithm 400 for determining if a memory address is in a cache memory. The algorithm 400 may be used in a memory system of a computer system, such as one shown in FIG. 1 and FIG. 3a. The algorithm 400 may be used whenever a processing unit of the computer system provides a memory address to the memory system to read or write information to the memory system.

Determining if a memory address is in a cache memory may include parallel or substantially concurrent operation to help reduce delays, which could negatively impact performance of the computer system. A first parallel operation may be detecting a presence of errors (block 405). Errors may be present in information stored in the cache memory and may include errors in cache-tags stored in the cache memory, for example. Errors present in a cache-tag may be detected in an operation that makes use of an ECC associated with the cache-tag.

A second parallel operation may be comparing the cache-tag and a CPU-tag (block 410). The CPU-tag may be a portion of the memory address, while the cache-tag is based on the memory address. In general, the comparison may determine if the cache-tag and the CPU-tag are equal. If they are not equal, the comparison may determine a number of bits that differ between the cache-tag and the CPU-tag. The second parallel operation may also include a computing of all possible permutations of outputs (determinations if the memory address is in the cache memory) based on possible results from the detecting of errors in block 405 as well as the comparison in block 410 (block 415).

The execution of the two operations in parallel or substantially concurrently may help to reduce delay and potentially improve performance since a wait that formerly was about equal to a sum of the delay of the two operation is now decreased to about the longer of the delay of the two operations. Once the two operations complete, the actual result of the detecting of errors in block 405 is known and may be used to select an actual determination if the memory address is in the cache memory (block 420) and the determining if the memory address is in the cache memory may terminate. The selected determination may be used in the memory system to read from the memory address or write to the memory address.

Figure 5A:
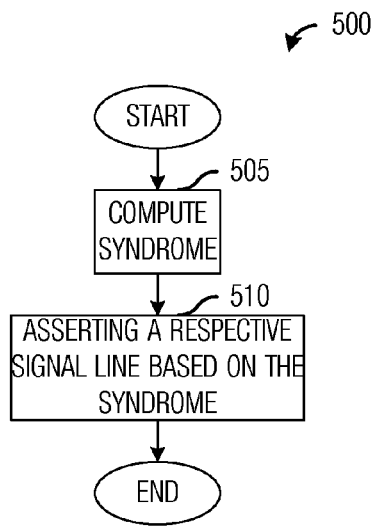
FIG. 5a is a flow diagram of an algorithm for detecting a presence of errors.

FIG. 5a is a flow diagram of an algorithm 500 for use in detecting a presence of errors. Algorithm 500 may be an implementation of detecting the presence of errors (block 405) of algorithm 400). Algorithm 500 includes computing an error syndrome for a cache-tag (block 505). The cache-tag may be retrieved from a cache tag memory based on a memory address provided by a processing unit. The error syndrome may be a pattern of bits representative of errors (if any) present in the cache-tag. In general, the error syndrome may be unique for different error patterns. For example, different cache-tags with identical error patterns may have the same error syndrome. However, different error patterns will have different error syndromes.

Algorithm 500 also includes asserting a respective signal line based on the error syndrome (block 510). For example, if the error syndrome contains information about a single bit error, then a true value may be asserted on a signal line associated with a single bit error (such as a SED signal line). Similarly, if the error syndrome contains information about a double bit error, then a true value may be asserted on a signal line associated with a double bit error (such as a DED signal line). If an ECC capable of detecting a larger number of bit errors, additional signal lines may be used. Algorithm 500 may then terminate.

Figure 5B:
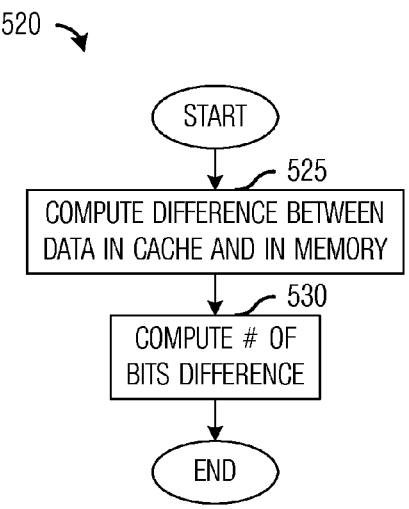
FIG. 5b is a flow diagram of an algorithm for comparing a cache-tag and a CPU-tag.

FIG. 5b is a flow diagram of an algorithm 520 for use in comparing a cache-tag and a CPU tag. Algorithm 520 may be an implementation of comparing data from cache and from processing unit (block 410 of algorithm 400). Algorithm 520 includes computing a difference between the cache-tag that is retrieved from cache memory and the CPU-tag that is provided by the processing unit (block 525). Preferably, the difference between the cache-tag and the CPU-tag is computed by performing a bit-wise comparison of the two. A count of a number of bits different between the two is computed (block 530). The count may be computed while the difference between the cache-tag and the CPU-tag is being computed or after the difference computation completes. Algorithm 520 may then terminate.

Figure 5C:
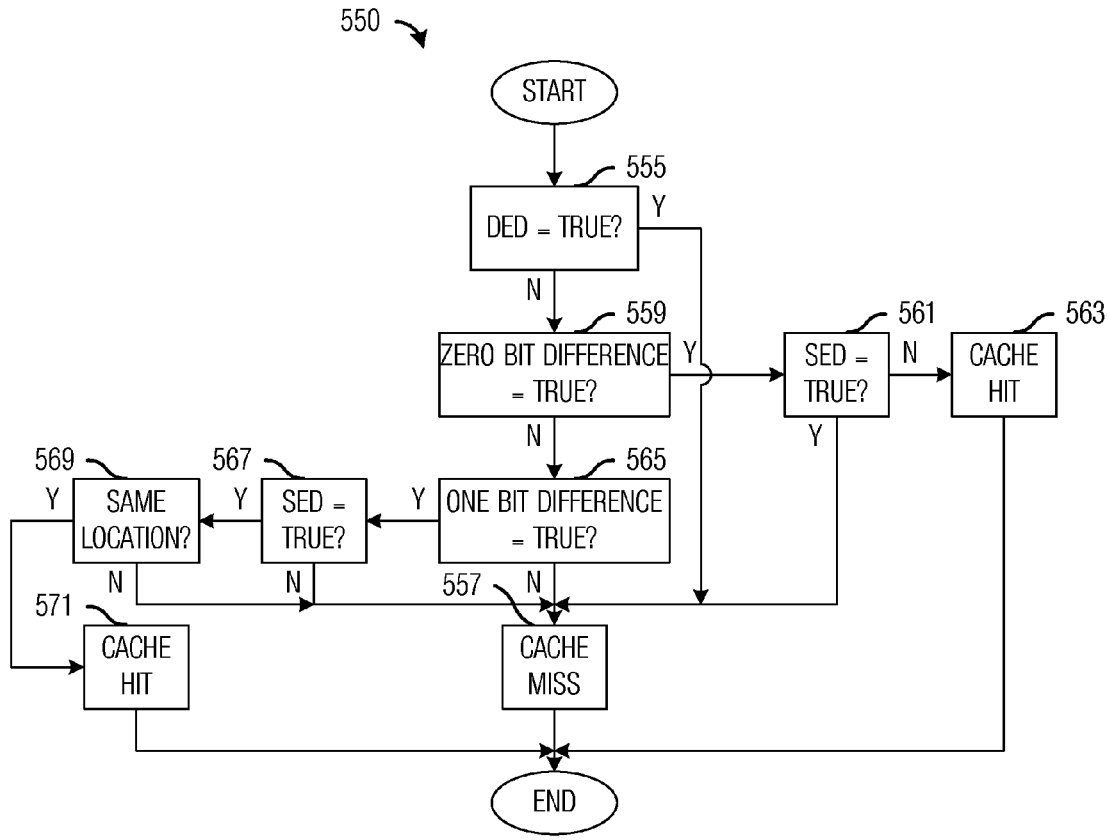
FIG. 5c is a flow diagram of an algorithm for determining if a memory address is in a cache memory using bit differences and error indications.

FIG. 5c is a flow diagram of an algorithm 550 for use in determining if a memory address is in a cache memory. Algorithm 550 may be descriptive of the determining if a memory address is in a cache memory from the presence (or absence) of errors in the cache-tag (as computed using algorithm 500, for example) and a difference between the cache-tag and the CPU-tag (as computed using algorithm 520, for example).

Algorithm 550 may begin with a check to determine if there is a true value on the DED signal line (block 555). If there is a true value on the DED signal line, then there was at least two bit errors in the cache-tag, which according to an embodiment, is too many bit errors to correct. Since there are too many bit errors to correct, data stored in cache memory associated with the cache-tag may not be reliable. Therefore, a cache memory miss may be declared for the memory address (block 557) and algorithm 550 may terminate.

If there is not a true value on the DED signal line, then a check to determine if there is a true value from a zero bit difference unit may be performed (block 559). A true value from the zero bit difference unit may indicate that there were no bit differences in the comparison of the cache-tag and the CPU-tag (block 525). If there was a true value from the zero bit difference, then a check to determine if there is a true value on the SED signal line may be performed (block 561). If there was a true value on the SED signal line, then there was one bit error in the cache-tag. If there was a true value on the SED signal line, then data stored in cache memory associated with the cache-tag may not be reliable since the cache-tag and the CPU-tag will not match once the cache-tag is corrected and a cache memory miss may be declared (block 557) and algorithm 550 may terminate. If there was not a true value on the SED signal line, then the cache-tag is equal to the CPU-tag and data stored in the cache memory associated with the cache-tag is correct. A cache memory hit may be declared (block 563) and algorithm 550 may terminate.

If there is not a true value from the zero bit difference unit, then a check to determine if there is a true value from a one bit difference unit may be performed (block 565). A true value from the one bit difference unit may indicate that there was a single bit difference in the comparison of the cache-tag and the CPU-tag (block 525). If there was not a true value from the one bit difference unit, then a cache memory miss may be declared (block 557) and algorithm 550 may terminate.

If there was a true value from the one bit difference unit, then a check may be performed to determine if there is a true value on the SED signal line (block 567). If there was a true value on the SED signal line, then there was one bit error in the cache-tag. If there was not a true value on the SED signal line, then data stored in cache memory associated with the cache-tag may not be reliable since the cache-tag and the CPU-tag will not match and a cache memory miss may be declared (block 557) and algorithm 550 may terminate. If there was a true value on the SED signal line, then a check may be performed to determine if a bit location as specified by the error syndrome is equal to a bit location resulting from the comparison of the cache-tag and the CPU-tag (block 569). If the bit locations are not equal, then the cache-tag and the CPU-tag will not match and a cache memory miss may be declared (block 557) and algorithm 550 may terminate. If the bit locations are equal, then the cache-tag and the CPU-tag will match and a cache memory hit may be declared (block 571) and algorithm 550 may terminate.

Figure 6B:
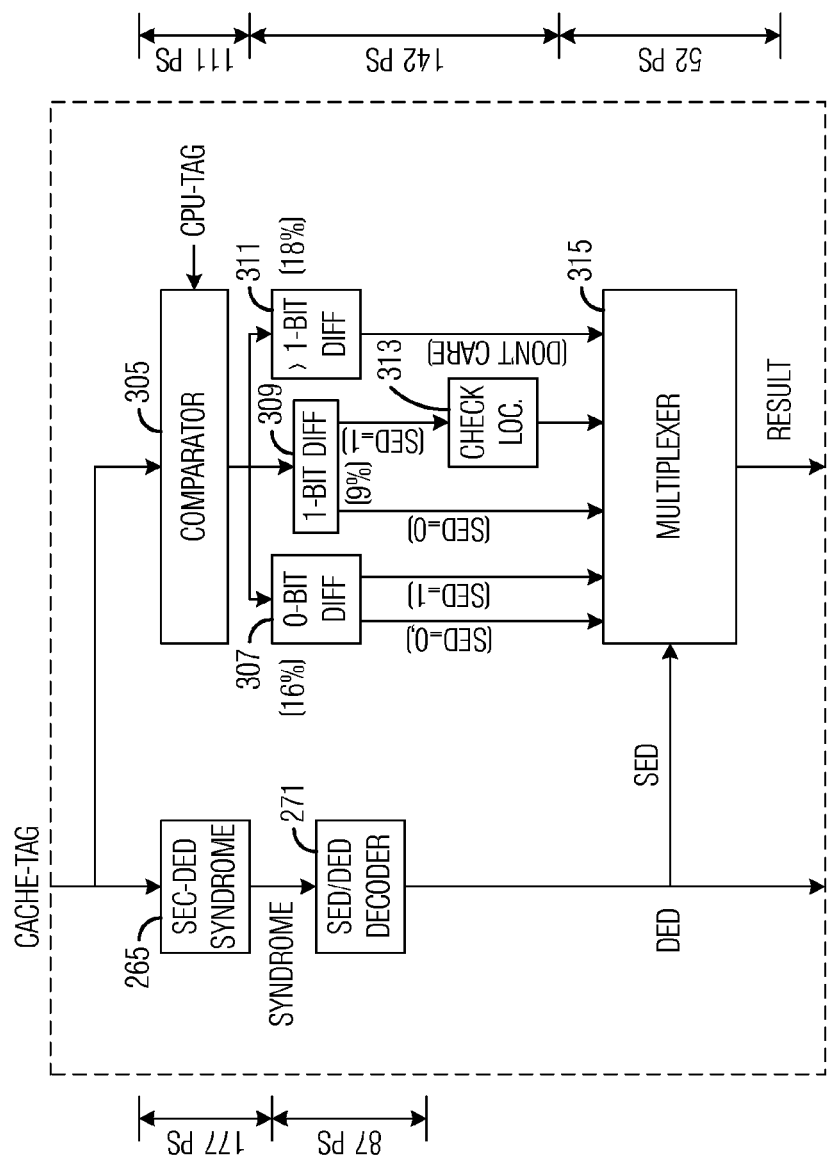
FIG. 6b is a diagram of simulated delays for components of cache memory access unit.
Figure 6A:
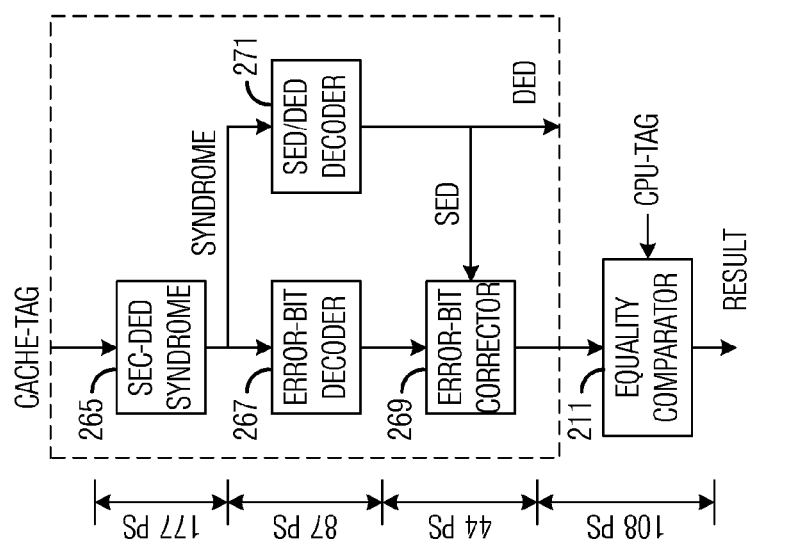
FIG. 6a is a diagram of simulated delays for components of a SEC-DED ECC unit.

FIG. 6a is a diagram illustrating simulated delays for components of SEC-DED ECC unit 209 and equality comparator 211. A model of SEC-DED ECC unit 209 and equality comparator 211 using a typical fabrication process was made and then simulated to obtain typical delays for components. As shown in FIG. 6a, simulated delays include 177 ps for SEC-DED syndrome unit 265, 87 ps for error bit decoder 267, 44 ps for error bit corrector, and 108 ps for equality comparator 211. Therefore, a critical path through SEC-DED ECC unit 209 and equality comparator 211 may add up to about 416 ps.

FIG. 6b is a diagram illustrating simulated delays for components of cache memory access unit 300. A model of cache memory access unit 300 using the same fabrication process as used for SEC-DED ECC unit 209 was made and then simulated to obtain typical delays for components. As shown in FIG. 6b, simulated delays include 177 ps for SEC-DED syndrome unit 265, 87 ps for SED/DED decoder 271, 111 ps for comparator 305, 142 ps for a combination of zero bit difference unit 307, one bit difference unit 309, greater than one bit difference unit 311, check location unit 313, and 52 ps for multiplexer 315. Therefore, a critical path through cache memory access unit 300 may add up to 305 ps.

Figure 7:
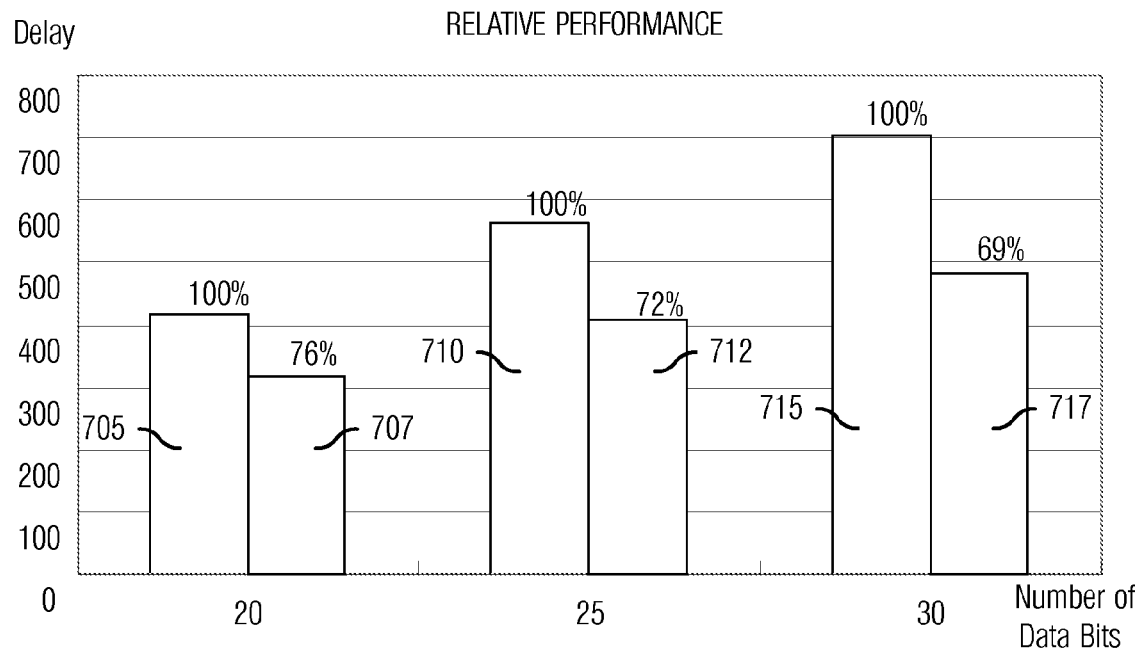
FIG. 7 is a data plot of delays through SEC-DED ECC unit and cache memory access unit with different data bits.

Comparing the delays through SEC-DED ECC unit 209 and equality comparator 211 (416 ps) with cache memory access unit 300 (305 ps), the delay through cache memory access unit 300 is about 35% shorter in duration. The difference in delay of SEC-DED ECC unit 209 and equality comparator 211 and cache memory access unit 300 may vary with number of data bits. FIG. 7 is a data plot of delay through SEC-DED ECC unit 209 and equality comparator 211 and cache memory access unit 300 for different data bits.

As shown in FIG. 7, a first column 705 represents a delay through SEC-DED ECC unit 209 and equality comparator 211 and a second column 707 represents a delay through cache memory access unit 300 for a memory system with 20 data bits. While a third column 710 represents a delay through SEC-DED ECC unit 209 and equality comparator 211 and a fourth column 712 represents a delay through cache memory access unit 300 for a memory system with 25 data bits and a fifth column 715 represents a delay through SEC-DED ECC unit 209 and equality comparator 211 and a sixth column 717 represents a delay through cache memory access unit 300 for a memory system with 30 data bits. The reduction in delay when in the cache memory access unit 300 are 24%, 28%, and 31%, respectively.

In addition to reducing the delay, cache memory access unit 300 may also reduce power consumption, with a simpler comparison than what is used in SEC-DED ECC unit 209 and equality comparator 211. Cache memory access unit 300 may achieve a reduction in power consumption of about 16% due to zero bit difference unit 307, 9% due to one bit difference unit 309, and 18% due to greater than one bit difference unit 311.

Furthermore, integrated circuit real estate requirements may also be less. Cache memory access unit 300 may require 25% less area due to a total gate count that is about three-quarter that of SEC-DED ECC unit 209 and equality comparator 211.

Although the embodiments and their advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A circuit for determining an in-cache status of a memory address, the circuit comprising:
    an error detect unit coupled to a cache memory, the error detect unit configured to compute an indicator of errors present in data stored in the cache memory, wherein the data is related to the memory address;
    a comparison unit coupled to the cache memory, the comparison unit configured to compare the data with a portion of the memory address, wherein the portion of the memory address is provided by a processing unit coupled to the circuit;
    a results unit coupled to the comparison unit, the results unit configured to compute a set of possible in-cache statuses based on the comparison of the data with the portion of the memory address; and
    a selection unit coupled to the results unit and to the error detect unit, the selection unit configured to select the in-cache status from the set of possible in-cache statuses based on the indicator.

2. The circuit of claim 1, wherein the error detect unit comprises:
    a syndrome unit coupled to the cache memory, the syndrome unit configured to compute the indicator of errors present in the data; and
    an error decoder coupled to the syndrome unit, the error decoder configured to assert a signal on a signal line associated with a number of errors present in the data.

3. The circuit of claim 2, wherein the number of errors is a number of bit errors in the data, and wherein the indicator comprises a signal line associated with a single bit error.

4. The circuit of claim 1, wherein the comparison unit performs a bit-wise comparison of the data with the portion of the memory address.

5. The circuit of claim 4, wherein the comparison unit is further configured to produce a count of a number of bit-wise differences between the data and the portion of the memory address.

6. The circuit of claim 1, wherein the results unit comprises:
    a zero bit difference unit coupled to the comparison unit, the zero bit difference unit configured to produce in-cache statuses based on when there is no bit difference between the data and the portion of the memory address;
    a single bit difference unit coupled to the comparison unit, the single bit difference unit configured to produce in-cache statuses based on when there is a single bit difference between the data and the portion of the memory address; and
    a greater than one bit difference unit coupled to the comparison unit, the greater than one bit difference unit configured to produce in-cache statuses based on when there are two or more bit differences between the data and the portion of the memory address.

7. The circuit of claim 6, wherein the results unit further comprises a check location unit coupled to the single bit difference unit, the check location unit configured to compare a first location of the single bit difference with a second location of a single error in the data.

8. The circuit of claim 7, wherein the check location unit comprises:
    a single error location encoder coupled to the single bit difference unit, the single error location encoder configured compute a second indicator from an output of the single bit difference unit; and
    an equality comparator coupled to the single error location encoder and to the error detect unit, the equality comparator configured to compare the indicator with the second indicator.

9. The circuit of claim 1, wherein the selection unit comprises a multiplexer having a control input coupled to the error detect unit.

10. The circuit of claim 1, wherein the data comprises a cache-tag and the portion of the memory address comprises a CPU-tag.

11. A computer system comprising:
    a processing unit configured to perform operations; and
    a memory system coupled to the processing unit, the memory system configured to store data and to detect and correct errors in data stored in the memory system, the memory system comprising,
        a cache memory coupled to the processing unit, the cache memory configured to provide a first level of storage,
        a cache memory controller coupled to the cache memory, the cache controller configured to determine if a memory address provided by the processing unit resides in the cache memory, wherein the cache memory controller computes an error indicator and a comparison of a portion of the memory address with data from the cache memory substantially concurrently to determine if the memory address resides in the cache memory, wherein the data is related to the memory address, and
        a main memory coupled to the processing unit, the main memory configured to provide a second level of storage.

12. The computer system of claim 11, wherein the cache memory controller comprises:
    an error detect unit coupled to a cache memory, the error detect unit configured to compute an error syndrome for data stored in the cache memory;
    a comparison unit coupled to the cache memory, the comparison unit configured to compare the data and a portion of the memory address;
    a results unit coupled to the comparison unit, the results unit configured to compute a set of possible statuses based on the comparison of the data and the portion of the memory address, wherein the set of possible status includes statuses for each possible indicator value and comparison result, wherein a status indicates if the memory address resides in the cache memory, and wherein an indicator is computed from the error syndrome; and a selection unit coupled to the results unit and to the error detect unit, the selection unit configured to select a status from the set of possible statuses based on the indicator.

13. The computer system of claim 12, wherein the error detect unit comprises:
 a syndrome unit coupled to the cache memory, the syndrome unit configured to compute the error syndrome from the data; and
 an error decoder coupled to the syndrome unit, the error decoder configured to assert a signal on a signal line associated with a number of errors present in the data.

14. The computer system of claim 12, wherein the memory system is capable of detecting up to two bit errors and correcting a one bit error, and wherein the results unit comprises:
 a zero bit difference unit coupled to the comparison unit, the zero bit difference unit configured to produce statuses based on the error syndrome when there is no bit difference between the data and the portion of the memory address;
 a single bit difference unit coupled to the comparison unit, the single bit difference unit configured to produce statuses based on the error syndrome when there is a single bit difference between the data and the portion of the memory address; and
 a greater than one bit difference unit coupled to the comparison unit, the greater than one bit difference unit configured to produce statuses based on the error syndrome when there are two or more bit differences between the data and the portion of the memory address.

15. The computer system of claim 14, wherein the results unit further comprises a check location unit coupled to the single bit difference unit, the check location unit comprising:
 a single error location encoder coupled to the single bit difference unit, the single error location encoder configured compute a second error syndrome from an output of the single bit difference unit; and
 an equality comparator coupled to the single error location encoder and to the error detect unit, the equality comparator configured to compare the error syndrome with the second error syndrome.

16. A method for determining if a memory address resides in a cache memory, the method comprising:
 computing an indication of an error in data in the cache memory associated with the memory address;
 comparing the data with a portion of the memory address;
 computing a set of possible permutations of the memory address residing in the cache memory based on results of the comparing and possible values of the indication; and
 selecting a permutation from the set of possible permutations using the indication;
 wherein the computing an indication occurs substantially concurrently with the comparing and the computing a set of possible permutations.

17. The method of claim 16, wherein the computing an indication comprises:
 computing a syndrome from the data; and
 asserting one of a plurality of signal lines based on the syndrome.

18. The method of claim 16, wherein the comparing comprises:
 performing a bit-wise comparison of the data and the portion of the memory address; and
 counting a number of bit differences.

19. The method of claim 18, wherein an error correcting code used in the cache memory is capable of detecting double bit errors, and wherein the computing the set of possible permutations comprises:
 computing a first permutation from the data and the portion of the memory address and a first possible value for the indication and the number of bit differences;
 computing a second permutation from the data and the portion of the memory address and a second possible value for the indication and the number of bit differences; and
 wherein the computing a first permutation and the computing a second permutation occur substantially concurrently.

20. The method of claim 18, wherein an error correcting code used in the cache memory is capable of detecting double bit errors, and wherein the computing the set of possible permutations comprises:
 computing a third permutation from the data and the portion of the memory address and a third possible value for the indication with the number of bit differences equal to zero;
 computing a fourth permutation from the data and the portion of the memory address and a fourth possible value for the indication with the number of bit differences equal to zero;
 computing a fifth permutation from the data and the portion of the memory address and a third possible value for the indication with the number of bit differences equal to one;
 computing a sixth permutation from the data and the portion of the memory address and a fourth possible value for the indication with the number of bit differences equal to one;
 computing a seventh permutation from the data and the portion of the memory address with the number of bit differences equal to two or more; and
 wherein the computing a third permutation, the computing a fourth permutation, the computing a fifth permutation, the computing a sixth permutation, and the computing a seventh permutation occur substantially concurrently.

* * * * *